United States Patent [19]

Benoit

[11] Patent Number: 4,816,104

[45] Date of Patent: * Mar. 28, 1989

[54] METHODS AND SYSTEMS FOR PREPARING FLAT-BOTTOM THERMOPLASTIC SACK

[75] Inventor: Gordon L. Benoit, Macedon, N.Y.

[73] Assignee: Mobil Oil Corporation, New York, N.Y.

[*] Notice: The portion of the term of this patent subsequent to Mar. 24, 2004 has been disclaimed.

[21] Appl. No.: 53,258

[22] Filed: May 22, 1987

Related U.S. Application Data

[63] Continuation of Ser. No. 815,978, Jan. 3, 1986, abandoned, which is a continuation-in-part of Ser. No. 606,320, May 2, 1984, abandoned.

[51] Int. Cl.⁴ .............................................. B65D 27/10
[52] U.S. Cl. ..................................... 156/204; 156/251; 156/290; 156/308.4; 493/195; 493/232
[58] Field of Search .............. 156/204, 251, 253, 290, 156/308.4, 515, 461; 493/193, 194, 197, 195, 203, 232, 239, 936; 383/8, 121, 123, 124, 120

[56] References Cited

U.S. PATENT DOCUMENTS

| | | | |
|---|---|---|---|
| 3,853,664 | 12/1974 | LaFleur | 56/350 |
| 3,857,329 | 12/1974 | Lehmacher | 493/203 |
| 3,966,524 | 6/1976 | Lehmacher | 383/8 |
| 4,652,253 | 5/1987 | Benoit | 493/195 |

FOREIGN PATENT DOCUMENTS

| | | | |
|---|---|---|---|
| 1055074 | 2/1958 | France . | |
| 1275399 | 5/1972 | United Kingdom | 383/121 |

Primary Examiner—David Simmons
Attorney, Agent, or Firm—Alexander J. McKillop; Michael G. Gilman; Charles J. Speciale

[57] ABSTRACT

A method and system for preparing flat bottom thermoplastic sacks comprising process steps and means for forming a tube of thermoplastic film, collapsing said tube while forming two oppositely disposed gussets therein, forming two pairs of diagonal sealed seams in the gussets, forming a transverse sealed seam across the tube along a line which includes the inboard ends of the diagonal seams and forming preweakened transverse lines closely adjacent to said transverse sealed seam or forming a severing line along this line, removing the four double triangular regions bounded by the diagonal seams, the transverse seams and the side edges of the tube and collecting the resulting structures either while still interconnected or by stacking the severed sacks. The final structure can have handles or it can be handleless.

2 Claims, 1 Drawing Sheet

U.S. Patent  Mar. 28, 1989  4,816,104
FIG. 1
FIG. 2
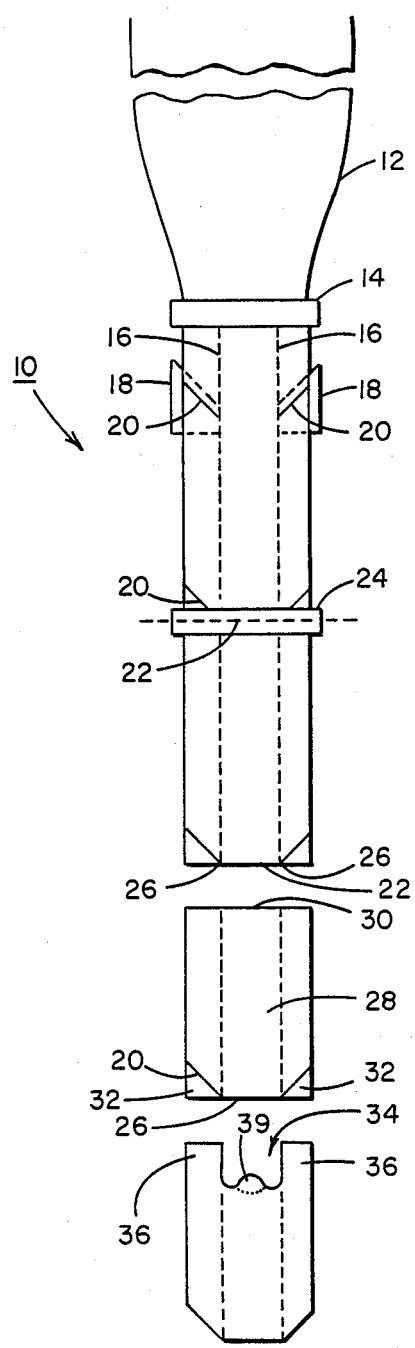
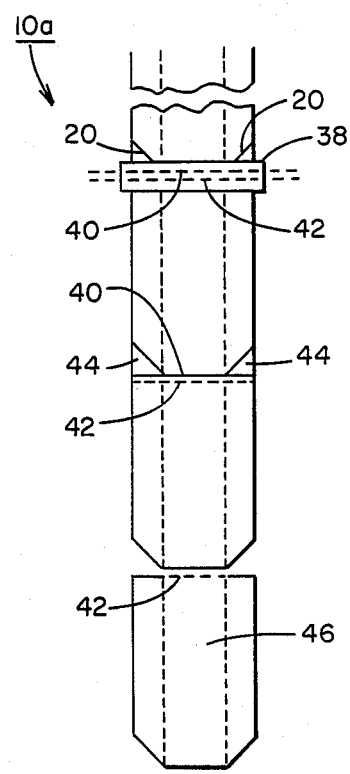

METHODS AND SYSTEMS FOR PREPARING FLAT-BOTTOM THERMOPLASTIC SACK

CROSS REFERENCE

This is a continuation of co-pending application Ser. No. 815,978, filed on Jan. 3, 1986, now abandoned, which is a continuation-in-part application of copending application Ser. No. 606,320, filed May 2, 1984, now abandoned the entire contents of which is incorporated into this application by reference.

The present invention relates to methods and systems for preparing a thermoplastic sack, and, more particularly, to methods and systems for preparing such a sack having at least a substantially flat rectangular bottom. One type of bag contemplated for preparation by a system and process of the present invention is more particularly defined in U.S. Pat. No. 4,554,192, issued Nov. 19, 1985, the disclosure of which is in its entirety incorporated by reference herein.

The bag structure of said patent application is of a thermoplastic film material and it comprises front and rear bag walls connected by gusseted side walls. The bag has an open mouth top portion, which is characterized by having handles located at opposite end regions thereof, said handles each being of two films as a result of being integral extensions of said front, rear and gusseted side walls. The bag has a bottom wall planarly extensible so as to form a rectangle with at least no substantial excess film outside of the bulk volumetric capacity of the bottom region of said bag. An alternative manner of describing the bottom of such a bag is that said bottom is formed from integral extensions of said front, rear and side walls and the closure thereof is 4 two-film gusset-to-wall heat seals, when said bottom is a square, and 4 two-film gusset-to-wall heat seals and 1 two-film front wall-to-back wall heat seals when said bottom is a rectangle. The present invention also contemplates forming the same type of bag without handles.

It is an object of the invention to present a process for the preparation of the above-defined flat bottom sack.

It is yet another object of the invention to present a process for the preparation of interconnected severable flat-bottomed grocery sacks.

It is still another object of the present invention to present processes of forming flat bottomed thermoplastic film sacks not having handles.

It is yet another object of the invention to present a process for preparing flat bottomed handled sacks in bag pack form.

A further object of the present invention is to present novel systems for the preparation of such thermoplastic film flat bottom sacks.

SUMMARY OF THE INVENTION

The present invention is concerned with a method for preparing a handled, at least substantially flat, rectangular bottom, thermoplastic film sack comprising:

(a) forming a tube of a thermoplastic film;

(b) collapsing said tube while simultaneously forming therein two, oppositely disposed, parallel gussets;

(c) forming two pairs of diagonal sealed seams over the portions of the tube width corresponding to the gussets along lines diagonal to the length of the tube, the seal pairs of opposite sides being at an angle to one another and the seams of each pair being in registration with one another;

(d) forming a transverse sealing and severing seam across and through said collapsed tube along a line which includes the inboard ends of said pairs of diagonal seams;

(e) collecting a plurality of the resulting structures in a stack;

(f) removing from each structure the four folded triangles of film located between the diagonal sealed seams and the transverse sealing and severing seam to complete the bottom of the sack; and (g) forming a pair of handles and sack mouth opening at the opposite end of said sack bottom. For a pack of such bags a tab member is removably attached to each side of the bag mouth opening and the tab fastened together.

The present invention is also concerned with a method of preparing gusseted web stock suitable for the formation of double film handle, thermoplastic bags comprising:

(a) providing a gusseted tube of thermoplastic film; and (b) continuously forming two pairs of diagonal sealed seams over the portions of the tube width corresponding to at least a major portion of the gussets along lines diagonal to the length of the tube beginning at the outer folds thereof, the seal pairs of opposite sides being at an angle to one another and the seams of each pair being in registration with one another, successive sealed pairs being spaced a bag length distance apart. After the gusseted lay-flat tube is so-diagonally sealed, a following operation can continuously remove a portion of the tube corresponding to the upper region of an individual bag so as to form a bag mouth opening and double-film loop handles while simultaneously transversely sealing the bottom of the bag along a line which includes the ends of said diagonal seals. Thereafter or simultaneously the four triangular regions outside of the diagonal seals can be removed as unnecessary film.

The present invention is also concerned with a method for preparing a handleless, at least substantially flat, rectangular bottom, thermoplastic film sack comprising:

(a) forming a tube of thermoplastic film;

(b) collapsing said tube while simultaneously forming therein two oppositely disposed, parallel, gussets;

(c) forming two pairs of diagonal sealed seams over the portions of the tube width corresponding to the gussets along lines diagonal to the length of the tube, the sealed pairs of opposite sides being at a angle to one another and the seams of each pair being in registration with one another;

(d) forming a transverse sealed seam across said tube along a line which includes the inboard ends of said pairs of diagonal seams and simultaneously forming a preweakened transverse line closely adjacent and parallel to said transverse sealed seam;

(e) removing the four double film triangular regions bounded by said diagonal seams, said transverse seams and the side edges of said tube; and (f) collecting the resulting structures while still interconnected at said preweakened transverse lines.

Another method according to the present invention involves continuously preparing a handleless, at least substantially flat, rectangular bottom, thermoplastic film sack comprising:

(a) forming a tube of thermoplastic film;

(b) collapsing said tube while simultaneously forming therein two oppositely disposed, parallel, gussets;

(c) forming two pairs of diagonal sealed seams over the portions of the tube which correspond to the gussets along lines diagonal to the length of the tube, the seal pairs of opposite sides being at an angle to one another and the seams of each pair being in registration with one another;

(d) forming a transverse sealed seam across said tube along a line which includes the inboard ends of said pairs of diagonal seams and simultaneously severing said tube along a line parallel to said transverse seal seam;

(e) removing the four double film triangular regions bounded by said diagonal seams, said transverse sever line and the side edges of said tube.

BRIEF DESCRIPTION OF THE DRAWING

FIG. 1 is a plan view, in schematic form illustrating a system and process sequence of one form of the present invention.

FIG. 2 is a plan view of another form of the process and system of the present invention.

DETAILED DESCRIPTION OF THE INVENTION

As indicated in FIG. 1, 10 illustrates a system and process sequence for forming a handled, gusseted, flat bottomed thermoplastic sack. A tube of thermoplastic film 12 is in the process of being collapsed, by being passed through a gusset forming means 14.

The tube collapsing and gusset-forming means 14 can be any device suitable for accomplishing these two steps substantially simultaneously. A typical gusset forming device is a open-ended box shaped arrangement of, for example, sheet metal material, which has two inwardly extending members which are brought to bear on the collapsing thermoplastic tube so as to form two oppositely disposed inwardly extending folds or gussets. The device gradually tapers to cause the gusseted tube to collapse completely. These gussets are illustrated in the drawing by dotted lines 16. The gusset forming means 14 can be prepared in a plurality of different size gusset forming means so as to permit flexibility in the dimension of the resulting gusset in-fold. The gusset forming means can be such as to impress a gusset in a tube of anywhere from a fraction of an inch up to that providing gussets which extend all the way to the midline of a fully collapsed tube. The gusseted portion of the tube thereafter transverses two Teflon coated plates 18, (or some other suitable non-stick separating surface) each of which extend into the full reach of the gusset 16. Thereafter, a sealed seam is impressed in each of the four gusset folds as shown at 20. The Teflon plate prevents one seam from fusing to the other on each side of the tube. These seams are best formed by heat sealing members which are Teflon coated resistance wires heated to a temperature which will permit the two layers of each of the four gusset folds to be heat sealed together but not severed. These diagonal sealed seams extend over the portions of the tube width corresponding to the gussets along lines diagonal to the length of the tube and the seal pairs of opposite sites are at an angle to one another, preferably at an angle of an least approximately 90°. The seams of each pair of seams on each side of the gusseted tube are in registration with one another. In other words, beneath seam 20, and on the other side of Teflon separator plate 18, there is an identical seal 20. As the tbe and seals 20 progress through the system there is subsequently formed a bottom seal 22 which simultaneously seals and severs the bottom of the gusseted structure. This is accomplished by means of bottom sealing and severing device 24. Seal line 22 is a transverse sealing and severing seam which extends across and through the collapsed tube along a line which includes the inboard ends 26 of each pair of diagonal seams. Transverse sealing and severing device 24 can be any suitable means which will bond and sever the collapsed tube along the defined line. This sealing and severing action will isolate sack blank 28 from the collapsed and gusseted tube. Sack blank 28 will have a seal 30 across the top thereof and 4 triangular regions 32 will be bounded by seal lines 20, 26 and the side edge of the gusseted structure. The sack blank structures 28 may be separately or collectively converted into bag structures by removal of the triangular regions 32 and by the formation of bag mouth opening 34 which simultaneously forms handle loops 36, each of which are formed of two layers of film by virtue of the gusseted structure. This will complete the formation of a handled sack, the bottom of which can be planarly extended so as to have a flat bottom. By "planarly extended" is meant that the bag is extended in internal volume to its utmost by expanding the gussets fully, thereby forming a flat bottom, rectangular in nature, having a length larger than its width.

In a preferred embodiment of the process and system illustrated in the drawing, a linear low density polyethylene tubular film 12, of about 1 mil in thickness, is collapsed and simultaneously gusseted by passing through gusset forming means 14. This action infolds the collapsed tube to yield gussets 16. As the gusseted tube progresses through the system, seals 20 and 26 are simultaneously formed. This action produces bottom seal 26 and top seal 30 at the same time. This also isolates sack blank 28. Sack blank 28 can then be removed to a station which can separately remove triangular sections 32 and bag mouth opening 34 and form handles 36 on individual blanks. Alternatively, the blanks 28 can be stacked in vertical registration and through the means of suitable cutting die mechanisms, the triangular regions removed and the handle and bag mouth opening can be formed. A typical bag can have a bag front and rear wall width of about 12 inches, 4 inch gusset folds, yielding 8 inch side walls and a bag length of about 20-25 inches with or without handles.

For the formation of bags which do not contain a handle, the process and the system are as shown in FIG. 2. The process and system 10a is different from that of FIG. 1 beginning at the point where the bottom of the bag is sealed. Thus, a bottom seal and perforating mechanism 38 is shown impressing seal seam 40 in the flattened gusseted tube and, simultaneous therewith, perforation line 42 is formed closely adjacent and parallel to seal line 40. Seal line 40 does not sever the tube, merely seals it. Seal line 40 and perforation line 42 are impressed in the gusseted tube at the same time diagonal seals 20 are impressed into the gussets. Thereafter, by any suitable die cutting mechanism, the four regions 44 are removed from the structure. This will yield sack 46 attached by perforation line 42 to a like structure. Thereafter, these sacks may be rolled upon themselves to form a cylindrical package, collected in a zig-zag folded stack arrangement or individually separated and folded or stacked. Either structure will permit a sack to be torn free along the perforation lines to yield an open mouth bag which when extended fully to the total width of the gusset, will yield a flat bottomed sack. The sack resulting from the process and system of FIG. 2 will have a rectangular bottom with a length larger than its width.

In a modification of the process and system shown in FIG. 2, open mouth handleless structures can be formed by forming a severance transversely across the tube at the same time bottom seal 40 is formed. Thereafter the corners of the sack blank corresponding to regions 44 can be severed to complete the bag structure.

Bags of the structures described can be formed with a pair of registered tabs as integral extensions of the bag mouth as shown at 39 in FIG. 1. The bags can be stacked in registration to contain 50, 100, 150, etc., bags and the tabs 39 fastened together in some suitable manner. For example, the tabs can be ultrasonically welded together A perforation line across the tab will form a convenient tear-off site for individual bags to be removed from the bag pack.

Bags of the structures described can be formed by employing any suitable thermoplastic material, for example, polyolefins. In employing the term "polyolefins" its employed generically to include all forms of the polymer species including, for example, low density polyethylene, linear low density polyethylene, mixtures and blends of the same, and other monomer counterparts, etc. Thermoplastic coated paper stock is also contemplated. The bag film can be of any gauge, for example, from about 0.3 to about 5 mils in thickness.

In forming the flat bottomed bag, it is preferred that the angle between the diagonal seal line and the bottom seal be at least approximately 135° when said bag is in its lay flat condition. It is also preferred that the open mouth portion of the handled sacks of the present invention have stress relief curves or arcs extending from the base of the handle to a raised portion of the bag mouth. This will militate against splitting or tears occurring in the bag mouth during handle extension or when the bag is being filled with bulky material. The handles and bag mouth opening can have any configuration.

In forming the bag structure the pertinent angles need not be precise, e.g. exactly 90°, 45° or 135°. Reasonable processing latitude should permit some deviation from these guidelines. Likewise, in forming seal seams, the ends thereof can be curved or angled in order to accommodate or insure good closure at all film interfaces and joints. Double or plural line seams and seals are also contemplated.

As disclosed, the bag structure formed by the system and process illustrated in FIGS. 1 and 2 will yield a sack having a rectangular bottom when planarly extended, which bottom will have a length longer than its width. In other words, the sack bottom will not be a square. In order to form a square bottom sack either with or without handles the process and means merely need be modified so that the gusset folds are both infolded to the maximum. That is, the collapsed tube will be gusseted to the longitudinal mid-line of the tube. In this case the center-fold of each gusset will contact the other and the angle between the thereafter formed diagonal seams will be at least about 90°. The resulting sack will then have a substantially flat square bottom when planarly extended.

What is claimed is:

1. A method of continuously preparing an at least substantially flat, rectangular-bottom, thermoplastic film sack comprising:
   (a) forming a tube of thermoplastic film having two oppositely disposed, parallel gussets;
   (b) forming two pairs of diagonal sealed seams over the portions of the tube width corresponding to the gussets along lines diagonal to the length of the tube, the seal pair of opposite sides being at an angle to one another and the seams of each pair being in registration with one another;
   (c) forming a transverse sealed seam across said tube along a line which includes the inboard ends of said pairs of diagonal seams, thereby forming four double film triangular regions bound by said seams, said transverse seam, and the side edges of the tube, said transverse sealed seam simultaneously defining a top seal and bottom seal, respectively, for adjacent sacks formed from said tube;
   (d) collecting the resulting structure in a stack;
   (e) removing the four double film triangular regions; and
   (f) continuously removing a portion of said tube corresponding to the upper region of each individual sack for forming double-film loop handles and sack mount opening at the end opposite from said bottom seal of each sack.

2. A method as defined in claim 1 wherein the step of forming said transverse sealed seam includes simultaneously severing said tube along said transverse sealed seam.

* * * * *